US011374648B2

(12) United States Patent
Muren et al.

(10) Patent No.: US 11,374,648 B2
(45) Date of Patent: Jun. 28, 2022

(54) RADIO LINK COVERAGE MAP GENERATION USING LINK QUALITY AND POSITION DATA OF MOBILE PLATFORM

(71) Applicant: FLIR Unmanned Aerial Systems AS, Hvalstad (NO)

(72) Inventors: Petter Muren, Hvalstad (NO); Tom-Ivar Johansen, Hvalstad (NO); Torgeir Grothe Lien, Hvalstad (NO); Trygve F. Marton, Hvalstad (NO)

(73) Assignee: FLIR Unmanned Aerial Systems AS

( * ) Notice: Subject to any disclaimer, the term of this patent is extended or adjusted under 35 U.S.C. 154(b) by 0 days.

(21) Appl. No.: 17/079,349

(22) Filed: Oct. 23, 2020

(65) Prior Publication Data

US 2021/0058143 A1 Feb. 25, 2021

Related U.S. Application Data

(63) Continuation of application No. PCT/US2019/025458, filed on Apr. 2, 2019.
(Continued)

(51) Int. Cl.
 *H04B 7/185* (2006.01)
 *H04W 76/10* (2018.01)
 *H04W 16/18* (2009.01)

(52) U.S. Cl.
 CPC ........ *H04B 7/18504* (2013.01); *H04W 16/18* (2013.01); *H04W 76/10* (2018.02)

(58) Field of Classification Search
 CPC .. H04B 7/18504; H04B 17/318; H04B 17/27; H04B 7/18502; H04W 76/10;
(Continued)

(56) References Cited

U.S. PATENT DOCUMENTS

2006/0183487 A1* 8/2006 Allen .................... H04W 24/02
 455/456.5
2015/0312774 A1* 10/2015 Lau ....................... H04W 24/10
 455/446
(Continued)

FOREIGN PATENT DOCUMENTS

GB 2423217 8/2006
WO WO 2017/019570 2/2017

OTHER PUBLICATIONS

Bekhti et al., "Path Planning of Unmanned Aerial Vehicles with Terrestrial Wireless Network Tracking", Wirelessdays 2016, Mar. 2016, Toulouse, 16 pages.
(Continued)

*Primary Examiner* — Philip Sobutka
(74) *Attorney, Agent, or Firm* — Haynes and Boone, LLP

(57) ABSTRACT

Radio link coverage mapping systems and related techniques are provided to improve the operation of unmanned mobile sensor or survey platforms. A radio or communication link coverage mapping system includes a logic device configured to communicate with a communication module and a position sensor coupled to a mobile platform, where the communication module is configured to establish a wireless communication link with a base station associated with the mobile platform and the position sensor is configured to provide a position of the mobile platform as it maneuvers within a survey area. The logic device determines communication link quality data associated with the wireless communication link as the mobile platform maneuvers within the survey area, receives corresponding position data, and generates corresponding communication coverage information, which may be used to generate a radio link coverage map.

18 Claims, 4 Drawing Sheets

Related U.S. Application Data

(60) Provisional application No. 62/664,719, filed on Apr. 30, 2018.

(58) Field of Classification Search
CPC ..... H04W 4/021; H04W 16/18; H04W 16/20; H04W 24/02; H04W 24/00; H04W 28/0226; H04W 4/029; H04W 4/38; H04W 64/00; H04W 64/003; H04W 64/006; H04W 84/06
See application file for complete search history.

(56) References Cited

U.S. PATENT DOCUMENTS

2018/0038695 A1    2/2018  Bitra et al.
2018/0292844 A1*  10/2018  Kosseifi ................. B60L 53/51

OTHER PUBLICATIONS

Teng et al., "Aerial Sensing and Characterization of Three-Dimensional RF Fields", Carnegie Mellon University, Sep. 2016, 6 pages.
Jun et al., "Path Planning for Unmanned Aerial Vehicles in uncertain and Adversarial Environments", Chapter 6, Cooperative Control: Models, Applications and Algorithms. Springer US, 2003. pp. 95-110.

* cited by examiner

RADIO LINK COVERAGE MAP GENERATION USING LINK QUALITY AND POSITION DATA OF MOBILE PLATFORM

CROSS-REFERENCE TO RELATED APPLICATIONS

This application is a continuation of International Patent Application No. PCT/US2019/025458 filed Apr. 2, 2019 and entitled "RADIO LINK COVERAGE MAP AND LOSS MITIGATION SYSTEMS AND METHODS," which is incorporated herein by reference in its entirety.

International Patent Application No. PCT/US2019/025458 filed Apr. 2, 2019 claims priority to and the benefit of U.S. Provisional Patent Application No. 62/664,719 filed Apr. 30, 2018 and entitled "RADIO LINK COVERAGE MAP AND LOSS MITIGATION SYSTEMS AND METHODS" which is hereby incorporated by reference in its entirety.

TECHNICAL FIELD

The present invention relates generally to radio link coverage mapping and, more particularly, to systems and methods for wireless communication link coverage mapping and loss mitigation.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. Operation of such systems typically includes real-time wireless transmissions between the unmanned platform and a remote base station, which often includes a display to efficiently convey telemetry, imagery, and other sensor data captured by the platform to an operator. The operator can often pilot or otherwise control an unmanned platform throughout an entire mission relying solely on received data from the unmanned platform.

Such systems typically rely on an active communication link being present between the platform and the base station; however, as the platform navigates through an area or mission, intervening topography can change and relative distance can increase, which can alter or degrade the quality of the communications over the communication link, which, in turn, can cause the platform to end the mission prematurely or become damaged or lost. Such problems only increase as the performance of unmanned platforms increase, which enhances general operational demands. Thus, there is a need in the art for methodologies to reliably quantify the quality of such communications and mitigate the operational effects of significant degradation and/or loss of communications between the platform and a remote base station and/or control unit.

SUMMARY

Radio or wireless communication link coverage mapping systems and related techniques are provided to improve the operation of unmanned mobile sensor or survey platforms. One or more embodiments of the described radio link coverage mapping systems may advantageously include a communication module to establish and/or measure communication link quality of one or more wireless communication links, a position sensor to measure positions of a coupled mobile platform, a controller to control operation of the communication module, the position sensor, and/or the mobile platform, and one or more additional sensors to measure and provide sensor data corresponding to maneuvering and/or other operation of the mobile platform.

In various embodiments, such additional sensors may include a remote sensor system configured to capture sensor data of a survey area from which a two and/or three dimensional spatial map of the survey area may be generated. For example, the mapping system may include one or more visible spectrum and/or infrared cameras and/or other remote sensor systems coupled to a mobile platform. The mobile platform may generally be a flight platform (e.g., a manned aircraft, a UAS, and/or other flight platform), a terrestrial platform (e.g., a motor vehicle), or a water born platform (e.g., a watercraft or submarine).

In one embodiment, a system includes a logic device configured to communicate with a communication module and a position sensor coupled to a mobile platform, where the communication module is configured to establish a wireless communication link with a base station associated with the mobile platform and the position sensor is configured to provide a position of the mobile platform as it maneuvers within a survey area. The logic device may be configured to determine communication link quality data associated with the wireless communication link between the mobile platform and the base station and corresponding to one or more positions of the mobile platform as the mobile platform maneuvers within the survey area, receive position data corresponding to the one or more positions of the mobile platform, and generate communication coverage information corresponding to the survey area based, at least in part, on a combination of the position data and the communication link quality data.

In another embodiment, a method includes determining communication link quality data associated with a wireless communication link between a mobile platform and a base station and corresponding to one or more positions of the mobile platform as the mobile platform maneuvers within a survey area, receiving position data corresponding to the one or more positions of the mobile platform, and generating communication coverage information corresponding to the survey area based, at least in part, on a combination of the position data and the communication link quality data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
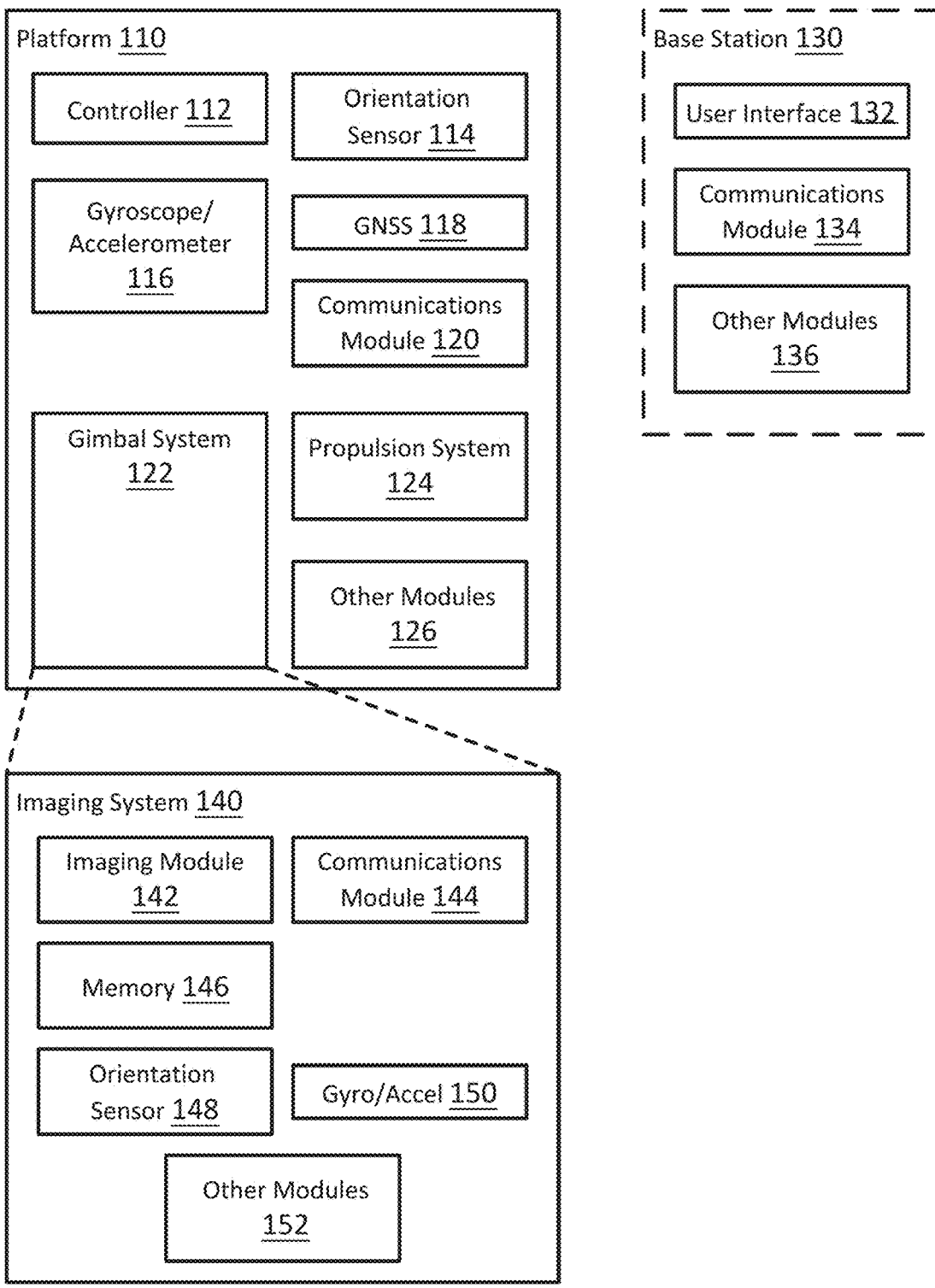
FIG. 1 illustrates a diagram of a radio link coverage mapping system in accordance with an embodiment of the disclosure.

Radio link coverage mapping systems and related techniques are provided to improve the operational flexibility and reliability of unmanned sensor platforms. A radio link coverage mapping system may advantageously include a communication module to establish and/or measure communication link quality of one or more wireless communication links, a position sensor to measure positions of a coupled mobile platform, a controller to control operation of the communication module, the position sensor, and/or the mobile platform, and one or more additional sensors to measure and provide sensor data corresponding to maneuvering and/or other operation of the mobile platform. In various embodiments, such additional sensors may include a remote sensor system configured to capture sensor data of a survey area from which a two and/or three dimensional spatial map of the survey area may be generated. For example, the mapping system may include one or more visible spectrum and/or infrared cameras and/or other remote sensor systems coupled to a mobile platform. The mobile platform may generally be a flight platform, a terrestrial platform, or a water born platform.

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments. Such systems typically rely on an active communication link being present between the platform and the base station. Information about the quality of such communications is helpful to mitigate the operational effects of significant degradation and/or loss of communications between the platform and a remote base station and/or control unit.

Embodiments of the present disclosure are configured to acquire information about communication quality as a function of position during operation of an unmanned sensor platform within a specified area and to generate communication coverage information corresponding to the placement of a base station in the specified area. The generated communication coverage information may be stored and used by the unmanned sensor platform autonomously, for example, or be transmitted to the base station and presented to an operator for use before, during, or after a particular survey. In various embodiments, the communication coverage information may be coupled with a map of the area to generate a communication coverage map of the operational area.

In general, as the unmanned sensor platform navigates through an operational area, information about the quality of the communication link between the unmanned sensor platform and the base station (e.g., packet loss, carrier signal strength, multipath signal characteristics, and/or other communication link characteristics) and the position(s) of the unmanned sensor platform and/or the base station may be monitored, linked to each other, stored and/or transmitted between the unmanned sensor platform and the base station. Such information linking may be provided by timestamps generated substantially simultaneously with the communication link characteristics data and the position data, for example, such as timing signals and/or data integrated within communication packets transmitted between the unmanned sensor platform and the base station and/or within the position data (e.g., as part of GNSS data), in addition to other referential data generated by the unmanned sensor platform, the base station, and/or an external source. Such linking may be configured to generate a record of specific communication link quality characteristics (e.g., packet loss) for specific positions of the unmanned sensor platform, relative to the base station and/or a known reference position in the operational area. Alternatively, communication link quality characteristics and position data may be sampled at given intervals, defined in time and/or distance, to reduce data storage and/or bandwidth requirements at the expense of spatial or temporal resolution.

In some embodiments, the linked information may be used by the unmanned sensor platform to facilitate at least partial autonomous operation of the unmanned sensor platform, such as: if communication is lost between the unmanned sensor platform and the base station, the unmanned sensor platform may be configured to return to a prior position providing an acceptable communication quality to transfer data and/or reestablish communications, for example, or to perform a particular maneuver (e.g., flight pattern) before returning to the prior "good" communication position. In other embodiments, the linked information may be used to direct an operator to move the base station to a new position estimated to reestablish communications.

In various embodiments, the linked information may be transmitted to the base station, either in real-time or after an operation, which may be configured to combine the linked information with a map or floor plan of the operational area to present the linked information as a communication coverage map, such as a heat map, that specifies communication link quality over the spatial extents of the map or floor plan. Such map or floor plan may be two or three dimensional. The communication coverage map may be stored at the base station and, if the base station includes a display, be presented in real time as a graphical overlaid map to the operator. During operation, this may provide insight for positioning the unmanned sensor platform for stationary observation, for example, or, if operation is to be undertaken in the same area at a future time, such communication coverage map may provide information for route planning of future operations.

FIG. 1 illustrates a block diagram of radio link coverage mapping system 100 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target.

In the embodiment shown in FIG. 1, radio link coverage mapping system 100 includes platform 110, optional base station 130, and at least one imaging system/sensor payload 140. Platform 110 may be a mobile platform configured to move or fly and position and/or aim sensor payload 140 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. Sensor payload 140 may be physically coupled to platform 110 and be configured to capture sensor data (e.g., visible spectrum images, infrared images, narrow aperture radar data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, and/or base station 130, such as the position and/or orientation of platform 110, sensor payload 140, and/or base station 130, for example, and the status of a communication link established between platform 110, sensor payload 140, and/or base station 130 (e.g., including packet loss of transmitted and received data between elements of system 100, such as with digital communication links) In particular, packet loss is traditionally estimated as a percentage of packets lost vs packets sent to a designated target. However, controller 112 may also be configured to categorize packet loss, such as a simplified scaling methodology that may be used to categorize the amount of packet loss acceptable for a specific use of platform 110 and/or sensor payload 140. Regardless, such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130 (e.g., including packet loss of transmitted and received data between elements of system 100, such as with digital communication links). Such status information may be provided to controller 112, for example, or transmitted to other elements of system 100 for monitoring, storage, or further processing, as described herein. In particular, communications module 120 may be configured to monitor packet loss of communications between platform 110 and base station 130 and/or categorize such packet loss according to an acceptable level of packet loss for a particular use or application associated with operation and/or a status of platform 110 and/or other elements of system 100. Regardless, communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for instance, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein. One or more such cameras/vision systems (e.g., other modules 126) may be used as a position sensor and configured to provide a position of platform 110 via visual odometry, simultaneous localization and mapping (SLAM), and/or other techniques, as a supplement and/or alternative to GNSS 118, such as when GNSS signals are effective blocked or jammed by walls, buildings, and/or environmental electromagnetic noise.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e g , similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/ accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/ accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
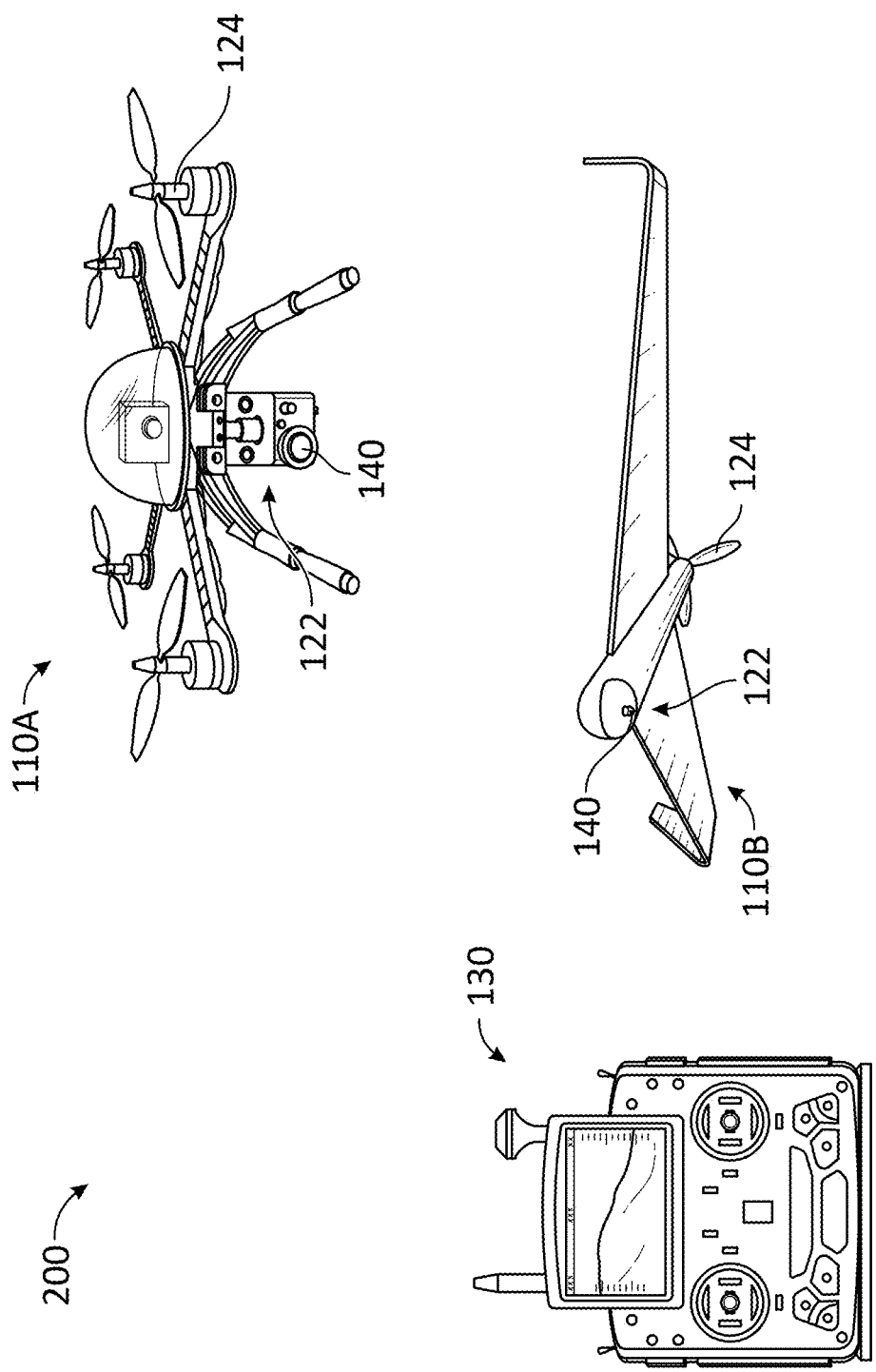
FIG. 2 illustrates a diagram of mobile platforms of a radio link coverage mapping system in accordance with an embodiment of the disclosure.

FIG. 2 illustrates a diagram of mobile platforms 110A and 110B of radio link coverage mapping system 200 including imaging systems/sensor payloads 140 and associated gimbal systems 122 in accordance with an embodiment of the disclosure. In the embodiment shown in FIG. 2, radio link coverage mapping system 200 includes base station 130, platform 110A with articulated imaging system/sensor payload 140 and gimbal system 122, and platform 110B with articulated imaging system/sensor payload 140 and gimbal system 122, where base station 130 may be configured to control motion, position, and/or orientation of platform 110A, platform 110B, and/or sensor payloads 140.

Figure 3:
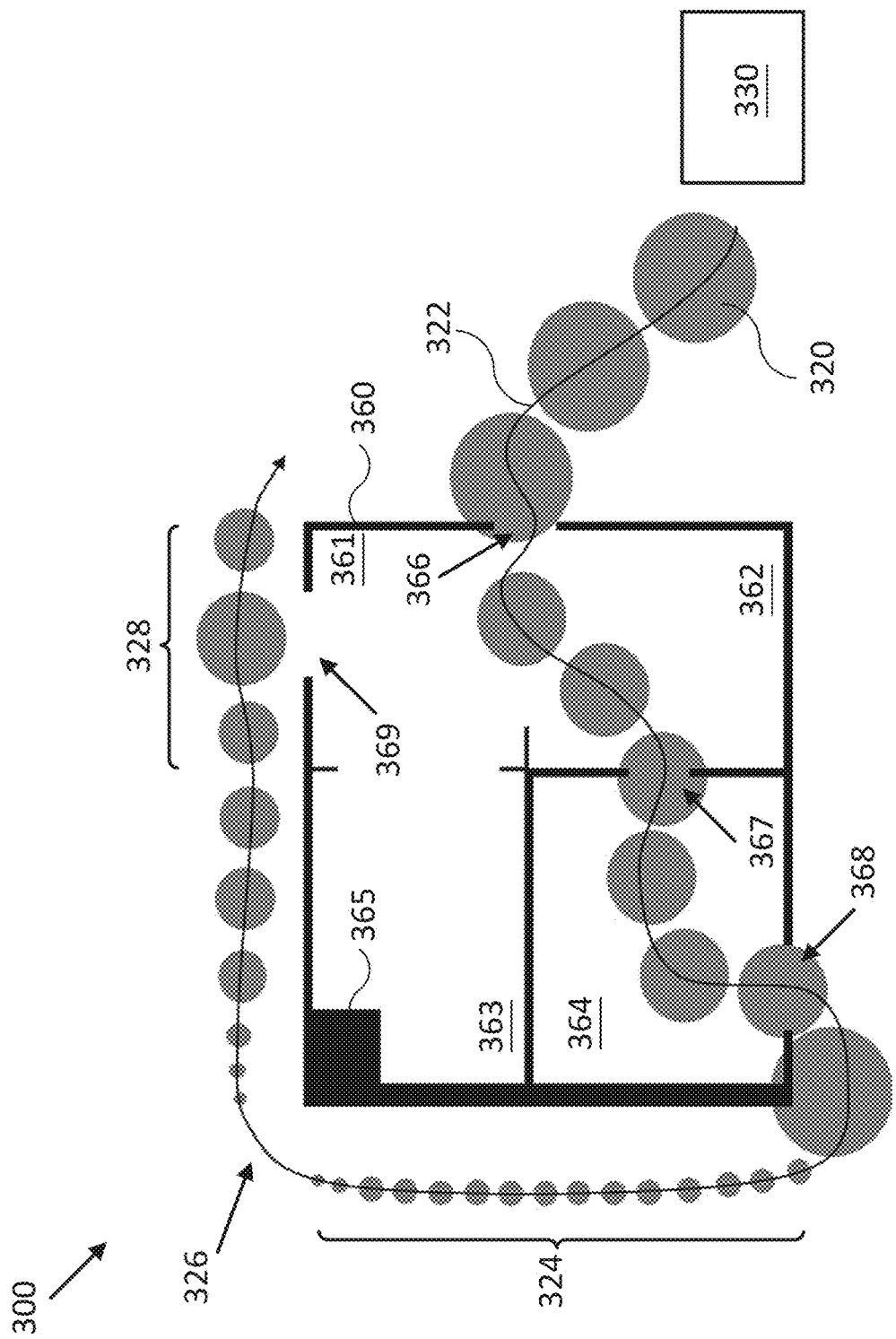
FIG. 3 illustrates a display view of a radio link coverage map generated by a radio link coverage mapping system in accordance with an embodiment of the disclosure.

FIG. 3 illustrates a display view of a radio link coverage map 300 generated by radio link coverage mapping system 100 in accordance with an embodiment of the disclosure. As shown in FIG. 3, radio link coverage map 300 includes base station indicator 330 indicating a position of base station 130 relative to survey path 322 (e.g., indicating a series of planned positions for platform 110) and a floor plan of building 360 to be surveyed by platform 110 according to survey path 322. In the embodiment shown in FIG. 3, radio link coverage map 300 includes multiple communication link quality indicators 320 implemented as shaded disks distributed along survey path 322.

In some embodiments, the diameter of each communication link quality indicator 320 represents the communication link quality (e.g., measured by communication modules 120, 134, and/or 144) between platform 110 at a position corresponding to the approximate center of each communication link quality indicator 320 (e.g., measured by GNSS 118), for example, and base station 130 at the approximate position indicated by graphic 330 (e.g., selected or placed by an operator within radio link coverage map 300 and/or measured by a GNSS of base station 130). In one embodiment, the diameter of each communication link quality indicator 320 may be inversely proportional to the measured packet loss between communication module 120 of platform 110 and communication module 134 of base station 130, as shown. In such embodiment, communication link quality indicators 320 may be normalized such that a maximum diameter of communication link quality indicators 320 is equal to the lowest measured packet loss/highest communication link quality.

In other embodiments, the size, shape, transparency, and/ or other graphical characteristics of communication link quality indicators 320 and/or portions of survey path 322 may be related to the communication link quality and/or a different communication link characteristic at the corresponding positions. For example, the diameter of each communication link quality indicator 320 may correspond to/indicate packet loss, and the transparency or shading color of each communication link quality indicator 320 may correspond to/indicate category of application (e.g., positional control, telemetry monitoring, high or low resolution video monitoring, motion (human presence/lack of presence) monitoring, and/or other applications), multipath signal degradation, packet collision rate (e.g., due to overlap of signal with other wireless communication networks), and/or overall signal strength.

In FIG. 3, survey path 322 starts proximate base station 130/330 and enters rooms 361 and 362 of building 360 at window/doorway 366, transits through room 362 and doorway 367 into room 364, and transits through room 364 and exits room 364 through doorway/window 368, all while corresponding communication link quality indicators 320 indicate relatively high communication link quality/low packet loss, due to proximity of base station 130/330 and lack of substantial obstruction between platform 110 and base station 130/330 (as indicated by the relatively thin walls of building 360 throughout the corresponding portion of survey path 322). Portion 324 of survey path 322 shows relatively small communication link quality indicators 320, indicating that the relatively thick wall of building 360 adjacent portion 324 of survey path 322 is likely partially obstructing or degrading wireless communications between platform 110 and base station 130/330. Further, portion 326 of survey path 322 shows zero communication link quality indicators 320, indicating that the relatively thick structure 365 (e.g., a fireplace, concrete support, and/or other thick structure) of building 360 is likely completely obstructing wireless communications between platform 110 and base station 130/330 (e.g., such as experiencing 100% packet loss over portion 326). Portion 328 of survey path 322 shows increasing communication link quality indicators 320, indicating that the communication link quality is steadily increasing as platform 110 nears base station 130/330 and/or windows/doorways 369 and 366 of building 360, as shown.

In various embodiments, platform 110 may be configured to monitor communication link quality along survey path 322, detect reduced communication link quality (e.g., below a preset quality threshold), such as along portions 324 and/or 326, and pilot platform 110 to continue along survey path 322 autonomously (e.g., if survey path 322 is a preset survey path), to halt progress along survey path 322 and issue an audible or visual alarm indicating to an operator that the position of base station 130/330 should be adjusted to increase communication link quality, or to pilot platform 110 according to a preset communication link reacquisition maneuvers, such as tracing back through communication path 322, increasing an altitude of platform 110, piloting platform 110 directly to a known or estimated position with sufficient communication quality (e.g., without retracing survey path 322), and/or other preset and/or determined reacquisition maneuvers, until the communication link quality increases above the quality threshold. In some embodiments, platform 110 may be configured to generate a floorplan of building 360, as shown in radio link coverage map 300, using imaging module 142 and/or other remote sensor system (e.g., sonar, lidar, radar, and/or other remote sensor systems) of sensor payload 140. In various embodiments, platform 110 may be configured to analyze radio link coverage map data (e.g., linked communication link quality data and position data) and select one of a variety of reacquisition maneuvers to reestablish reliable communications with base station 130/330.

Figure 4:
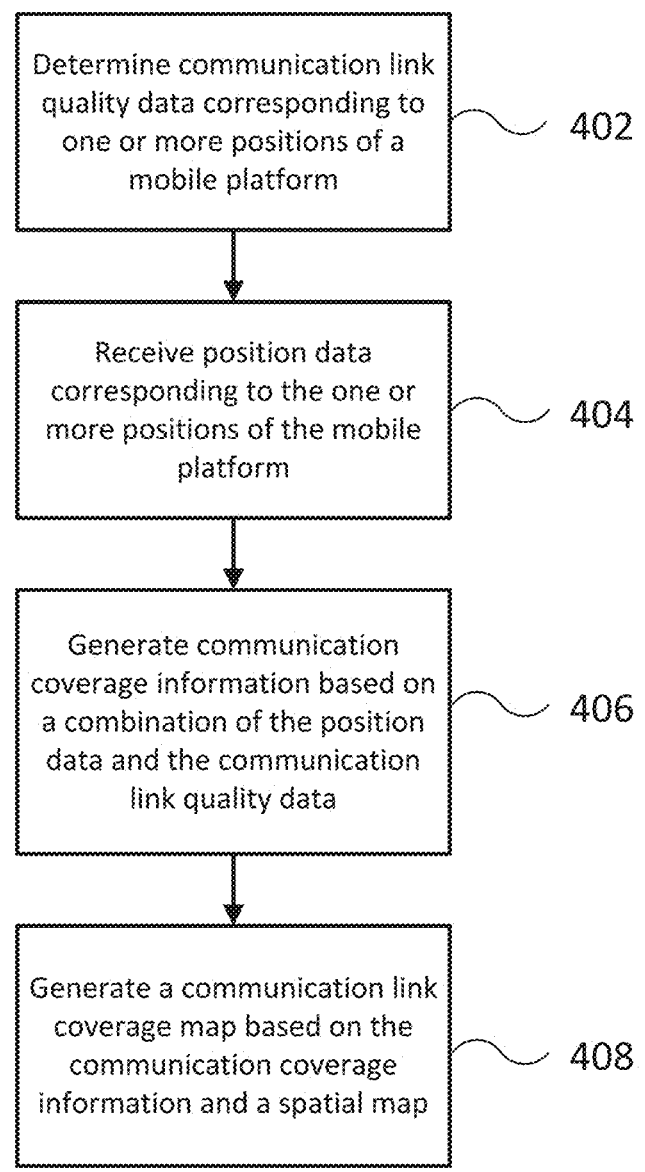
FIG. 4 illustrates a flow diagram of various operations to provide radio link coverage mapping using a radio link coverage mapping system in accordance with an embodiment of the disclosure.

FIG. 4 illustrates a flow diagram 400 of various operations to provide radio link coverage mapping using radio link coverage mapping system 100 in accordance with an embodiment of the disclosure. In some embodiments, the operations of FIG. 4 may be implemented as software instructions executed by one or more logic devices or controllers associated with corresponding electronic devices, sensors, and/or structures depicted in FIGS. 1-3. More generally, the operations of FIG. 4 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems described in FIGS. 1-3, process 400 may be performed by other systems different from those systems and including a different selection of electronic devices, sensors, assemblies, mechanisms, platforms, and/or platform attributes.

At block 402, communication link quality data is determined. For example, controller 112, communication module 120, user interface 132, and/or communication module 134 may be configured to determine communication link quality data associated with a wireless communication link established between communication module 120 of mobile platform 110 and communication module 134 of base station 130, where the communication link quality data corresponds to one or more positions of mobile platform 110 as mobile platform 110 maneuvers within a survey area (e.g., along survey path 322).

In some embodiments, controller 112 and/or user interface 132 may be configured to receive a least a portion of the communication link quality data from communication module 120 coupled to mobile platform 110 as mobile platform 110 maneuvers within a survey area. In various embodiments, the communication link quality data may include a packet loss, a packet loss categorization, a carrier signal strength, a carrier signal frequency or frequency band, a communication link frequency or frequency band, a packet collision rate, a multipath signal characteristic, other communication link characteristics, and/or a time stamp (e.g., provided at time of signal or packet reception or transmission by a communications module, for example, or by controller 112 and/or user interface 132 upon receiving communication link quality data from a communications module) for each of the one or more positions of mobile platform 110 as mobile platform 110 maneuvers within the survey area. In other embodiments, controller 112 and/or user interface 132 may be configured to receive a least a portion of the communication link quality data from communication module 134 coupled to or within base station 130 as mobile platform 110 maneuvers within the survey area.

At block 404, position data corresponding to one or more positions of a mobile platform is received. For example, controller 112 and/or user interface 132 may be configured to receive position data from GNSS 118 of mobile platform 110 corresponding to the one or more positions visited by mobile platform 110 as identified in block 402. In some embodiments, controller 112 and/or user interface 132 may be configured to receive a least a portion of the position data from GNSS 118 coupled to mobile platform 110. In such embodiments, the position data may include an absolute position of mobile platform 110, a relative position of mobile platform 110 relative to base station 130, and/or a time stamp for each of the one or more positions of mobile platform 110 as mobile platform 110 maneuvers within a survey area (e.g., provided at time of position measurement by a position sensor, for example, or by controller 112 and/or user interface 132 upon receiving position data from a position sensor).

In other embodiments, controller 112 and/or user interface 132 may be configured to receive a least a portion of the position data from a position sensor coupled to or within base station 130 (e.g., other modules 136). In such embodiments, the position data may include an absolute position of base station 130, a relative position of base station 130 relative to mobile platform 110, and/or a time stamp corresponding to at least one of the one or more positions of mobile platform 110 as mobile platform 110 maneuvers within the survey area, as described herein.

In additional embodiments, controller 112 and/or user interface 132 may be configured to receive orientation data from orientation sensor 114 of mobile platform 110 corresponding to orientation of mobile platform 110 at the one or more positions visited by mobile platform 110 as identified in block 402. In such embodiments, the orientation data may include an absolute orientation of mobile platform 110, a relative orientation of mobile platform 110 relative to a position of base station 130 (e.g., relative to the position vector from mobile structure 110 to base station 130), and/or a time stamp for each of one or more orientations of mobile platform 110 as mobile platform 110 maneuvers within the survey area.

At block 406, communication coverage information is generated. For example, controller 112 and/or user interface 132 may be configured to generate communication coverage information corresponding to a survey area based, at least in part, on a combination of the position data received in block 404 and communication link quality data determined in block 402. In some embodiments, controller 112 and/or user interface 132 may be configured to generate communication coverage information by linking communication link quality data corresponding to one of the one or more positions visited by mobile platform 110 with position data corresponding to the same one of the one or more positions, for each of the one or more positions of mobile platform 110 as mobile platform 110 maneuvers within the survey area.

In additional embodiments, controller 112 and/or user interface 132 may be configured to generate the communication coverage information corresponding to the survey area based, at least in part, on a combination of position data and orientation data received in block 404 and communication link quality data determined in block 402. Controller 112 and/or user interface 132 may be configured to generate communication coverage information by linking communication link quality data corresponding to one of the one or more orientations and positions visited by mobile platform 110 with orientation and position data corresponding to the same one of the one or more orientations and/or positions, for each of the one or more orientations and/or positions of mobile platform 110 as mobile platform 110 maneuvers within the survey area.

At block 408, a communication link coverage map is generated. For example, controller 112 and/or user interface 132 may be configured to generate communication link coverage map 300 based, at least in part, on the communication coverage information generated in block 406 and a spatial map of a survey area (e.g., the floorplan of building 360 in FIG. 3). In some embodiments, communication link coverage map 300 may include one or more communication link quality indicators 320 corresponding to the communication link quality data and the position and/or orientation data of respective blocks 402 and 404, survey path 322 corresponding to the position and/or orientation data and/or the one or more positions and/or orientations of mobile platform 110 within the survey area, and/or base station graphic 330 indicating a position of base station 130 within and/or relative to the survey area.

In various embodiments, controller 112 and/or user interface 132 may be configured to receive remote sensor data (e.g., image, sonar, lidar, and/or radar data) of the survey area corresponding to the one or more positions of mobile platform 110 (e.g., of the survey area represented by map 300, where the remote sensor data is captured along survey path 322). Such remote sensor data may be provided by remote sensor payload 140 coupled to mobile platform 110. Controller 112 and/or user interface 132 may be configured to generate a spatial map (e.g., a floorplan of building 360) of the survey area based, at least in part, on the remote sensor data and the position data received in block 404. In other embodiments, such spatial map may be known (e.g., blueprints, topographical maps, nautical and/or bathymetric charts, and/or other provided two or three dimensional spatial maps) and retrieved from memory by controller 112 and/or user interface 132 to generate communication link coverage map 300. Once generated, communication link coverage map 300 may be stored and used to plan a future survey path and/or to determine a reacquisition maneuver or other operation to mitigate risk of damage or loss of mobile platform 110 due to loss of communications with base station 130, for example, as described herein. In various embodiments, communication link coverage map 300 may be implemented as a two dimensional or a three dimensional spatial map, as described herein.

In some embodiments, controller 112 may be configured to detect that a communication link quality identified within the communication link quality data determined in block 402 is below a preset quality threshold. Upon such determination, controller 112 may be configured to determine a communication link reacquisition maneuver based, at least in part, on the communication coverage information generated in block 406 and/or the communication link coverage map generated in block 408, for example, and to control propulsion system 124 of mobile platform 110 to pilot mobile platform 110 according to the determined communication link reacquisition maneuver. Such communication link reacquisition maneuver may include halting mobile platform 110, landing or surfacing mobile platform 110, tracing back along a survey path of mobile platform 110 and/or the one or more positions of mobile platform 110 as it maneuvered with the survey area, increasing an altitude (or decreasing a depth) of mobile platform 110, and/or other maneuvers designed to reestablish a communication link with base station 110 or at least minimize risk of loss or damage to mobile platform 110.

In related embodiments, user interface 132 may also be configured to detect that a communication link quality identified within the communication link quality data determined in block 402 is below a preset quality threshold. In such embodiments, user interface 132 may be configured generate a visible, tactile, and/or audible alarm via user interface 132 and/or other modules 136 of base station 130 to alert an operator of base station 130 and/or mobile platform 110 that the communication link has degraded or been lost.

By providing such systems and techniques for radio or communication link mapping, embodiments of the present disclosure substantially improve the operational flexibility and reliability of unmanned sensor platforms. Moreover, such systems and techniques may be used to increase the operational safety of unmanned mobile sensor platforms above that achievable by conventional systems. As such, embodiments provide mobile sensor platforms systems with significantly increased survey convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
a logic device configured to communicate with a communication module and a position sensor coupled to a mobile platform, wherein the communication module is configured to establish a wireless communication link with a base station associated with the mobile platform, the position sensor is configured to provide a position of the mobile platform as it maneuvers within a survey area, and the logic device is configured to:
determine communication link quality data associated with the wireless communication link between the mobile platform and the base station and corresponding to one or more positions of the mobile platform as the mobile platform maneuvers within the survey area including receiving at least a portion of the communication link quality data from a second communication module coupled to or within the base station as the mobile platform maneuvers within the survey area;
receive position data corresponding to the one or more positions of the mobile platform; and
generate communication coverage information corresponding to the survey area based, at least in part, on a combination of the position data and the communication link quality data.

2. The system of claim 1, wherein the determining the communication link quality data comprises:
receiving at least a portion of the communication link quality data from the communication module coupled to the mobile platform as the mobile platform maneuvers within the survey area, wherein the communication link quality data comprises a packet loss, a packet loss categorization, a carrier signal strength, a packet collision rate, a multipath signal characteristic, other communication link characteristics, and/or a time stamp for each of the one or more positions of the mobile platform as the mobile platform maneuvers within the survey area.

3. The system of claim 1, wherein the receiving the position data comprises:
receiving at least a portion of the position data from the position sensor coupled to the mobile platform, wherein the position data comprises an absolute position of the mobile platform, a relative position of the mobile platform relative to the base station, and/or a time stamp for each of the one or more positions of the mobile platform as the mobile platform maneuvers within the survey area.

4. A system comprising:
a logic device configured to communicate with a communication module and a position sensor coupled to a mobile platform, wherein the communication module is configured to establish a wireless communication link with a base station associated with the mobile platform, the position sensor is configured to provide a position of the mobile platform as it maneuvers within a survey area, and the logic device is configured to:
determine communication link quality data associated with the wireless communication link between the mobile platform and the base station and corresponding to one or more positions of the mobile platform as the mobile platform maneuvers within the survey area;
receive position data corresponding to the one or more positions of the mobile platform, wherein the receiving the position data comprises:
receiving at least a portion of the position data from a second position sensor coupled to or within the base station, wherein the position data comprises an absolute position of the base station, a relative position of the base station relative to mobile platform, and/or a time stamp corresponding to at least one of the one or more positions of the mobile platform as the mobile platform maneuvers within the survey area; and
generate communication coverage information corresponding to the survey area based, at least in part, on a combination of the position data and the communication link quality data.

5. The system of claim 1, wherein the generating the communication coverage information comprises:
linking the communication link quality data corresponding to one of the one or more positions with the position data corresponding to the same one of the one or more positions, for each of the one or more positions of the mobile platform as the mobile platform maneuvers within the survey area.

6. The system of claim 1, wherein the logic device is configured to:
generate a communication link coverage map based, at least in part, on the communication coverage information and a spatial map of the survey area, wherein the communication link coverage map comprises one or more communication link quality indicators corresponding to the communication link quality data and the position data, a survey path corresponding to the position data and/or the one or more positions of the mobile platform within the survey area, and/or a base station graphic indicating a position of the base station within and/or relative to the survey area.

7. The system of claim 1, wherein the logic device is configured to:
receive remote sensor data of the survey area corresponding to the one or more positions of the mobile platform, wherein the remote sensor data is provided by a remote sensor payload coupled to the mobile platform; and
generate a spatial map of the survey area based, at least in part, on the remote sensor data and the position data.

8. The system of claim 1, further comprising the mobile platform, the communication module, the position sensor, and/or an orientation sensor configured to provide an orientation of the mobile platform as it maneuvers within the survey area, wherein the communication link quality data corresponds to one or more positions and orientations of the mobile platform as the mobile platform maneuvers within the survey area, the communication coverage information is based, at least in part, on a combination of orientation data corresponding to the one or more positions and orientations, the position data, and the communication link quality data, and the logic device is coupled to the mobile platform and is configured to:
detect that a communication link quality identified within the communication link quality data is below a quality threshold;
determine a communication link reacquisition maneuver based, at least in part, on the communication coverage information; and
control a propulsion system of the mobile platform to pilot the mobile platform according to the determined communication link reacquisition maneuver.

9. The system of claim 1, further comprising the base station and a second position sensor coupled within the base station, wherein the logic device is coupled within the base station and is configured to:
detect that a communication link quality identified within the communication link quality data is below a quality threshold;
generate a visible, tactile, and/or audible alarm via a user interface of the base station to alert an operator of the base station and/or the mobile platform.

10. A method comprising:
determining communication link quality data associated with a wireless communication link between a mobile platform and a base station and corresponding to one or more positions of the mobile platform as the mobile platform maneuvers within a survey area including receiving at least a portion of the communication link quality data from a second communication module coupled to or within the base station as the mobile platform maneuvers within the survey area;

receiving position data corresponding to the one or more positions of the mobile platform; and
generating communication coverage information corresponding to the survey area based, at least in part, on a combination of the position data and the communication link quality data.

11. The method of claim 10, wherein the determining the communication link quality data comprises:
receiving at least a portion of the communication link quality data from the communication module coupled to the mobile platform as the mobile platform maneuvers within the survey area, wherein the communication link quality data comprises a packet loss, a packet loss categorization, a carrier signal strength, a packet collision rate, a multipath signal characteristic, other communication link characteristics, and/or a time stamp for each of the one or more positions of the mobile platform as the mobile platform maneuvers within the survey area.

12. The method of claim 10, wherein the receiving the position data comprises:
receiving at least a portion of the position data from the position sensor coupled to the mobile platform, wherein the position data comprises an absolute position of the mobile platform, a relative position of the mobile platform relative to the base station, and/or a time stamp for each of the one or more positions of the mobile platform as the mobile platform maneuvers within the survey area.

13. The method of claim 10, wherein the receiving the position data comprises:
receiving at least a portion of the position data from a second position sensor coupled to or within the base station, wherein the position data comprises an absolute position of the base station, a relative position of the base station relative to mobile platform, and/or a time stamp corresponding to at least one of the one or more positions of the mobile platform as the mobile platform maneuvers within the survey area.

14. The method of claim 10, wherein the generating the communication coverage information comprises:
linking the communication link quality data corresponding to one of the one or more positions with the position data corresponding to the same one of the one or more positions, for each of the one or more positions of the mobile platform as the mobile platform maneuvers within the survey area.

15. The method of claim 10, further comprising:
generating a communication link coverage map based, at least in part, on the communication coverage information and a spatial map of the survey area, wherein the communication link coverage map comprises one or more communication link quality indicators corresponding to the communication link quality data and the position data, a survey path corresponding to position data and/or the one or more positions of the mobile platform within the survey area, and/or a base station graphic indicating a position of the base station within and/or relative to the survey area.

16. The method of claim 10, further comprising:
receiving remote sensor data of the survey area corresponding to the one or more positions of the mobile platform, wherein the remote sensor data is provided by a remote sensor payload coupled to the mobile platform; and
generating a spatial map of the survey area based, at least in part, on the remote sensor data and the position data.

17. The method of claim 10, wherein the communication link quality data corresponds to one or more positions and orientations of the mobile platform as the mobile platform maneuvers within the survey area, and wherein the communication coverage information is based, at least in part, on a combination of orientation data corresponding to the one or more positions and orientations, the position data, and the communication link quality data, the method further comprising:
- detecting that a communication link quality identified within the communication link quality data is below a quality threshold;
- determining a communication link reacquisition maneuver based, at least in part, on the communication coverage information; and
- controlling a propulsion system of the mobile platform to pilot the mobile platform according to the determined communication link reacquisition maneuver.

18. The method of claim 10, further comprising:
- detecting that a communication link quality identified within the communication link quality data is below a quality threshold;
- generating a visible, tactile, and/or audible alarm via a user interface of the base station to alert an operator of the base station and/or the mobile platform.

* * * * *